(12) United States Patent
Yamada

(10) Patent No.: US 8,223,222 B2
(45) Date of Patent: Jul. 17, 2012

(54) IMAGE STORING-TRANSFERRING METHOD AND APPARATUS, IMAGE PROCESSING METHOD, IMAGE PROCESSING SYSTEM, AND IMAGE PROCESSOR

(75) Inventor: Masahiko Yamada, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 423 days.

(21) Appl. No.: 12/255,525

(22) Filed: Oct. 21, 2008

(65) Prior Publication Data

US 2009/0046173 A1    Feb. 19, 2009

Related U.S. Application Data

(63) Continuation of application No. 09/774,706, filed on Feb. 1, 2001, now Pat. No. 7,460,157.

(30) Foreign Application Priority Data

Feb. 2, 2000 (JP) .................. 2000-025517

(51) Int. Cl.
*H04N 5/76* (2006.01)
(52) U.S. Cl. .................. 348/231.6; 348/222.1; 382/232
(58) Field of Classification Search .................. 348/222, 348/207.99, 231.3; 382/232–233
See application file for complete search history.

(56) References Cited

U.S. PATENT DOCUMENTS

| 5,615,310 A | 3/1997 | Kim |
| 5,991,457 A | 11/1999 | Ito et al. |
| 6,282,330 B1 | 8/2001 | Yokota et al. |
| 2004/0042679 A1 | 3/2004 | Yamada |

FOREIGN PATENT DOCUMENTS

| EP | 0 559 376 A1 | | 9/1993 |
| JP | 5-110819 A | | 4/1993 |
| JP | EP0559376 | * | 8/1993 |
| JP | 10-75364 | | 3/1998 |
| JP | 10-75395 | | 3/1998 |
| JP | 10-294857 A | | 11/1998 |
| JP | 10-315449 A | | 12/1998 |

* cited by examiner

*Primary Examiner* — Gevell Selby
(74) *Attorney, Agent, or Firm* — Sughrue Mion, PLLC

(57) ABSTRACT

Disclosed herein is a method of storing or transferring an image along with an image-processing parameter for processing the image. When storing or transferring a second image for storage or transfer which has a second resolution for storage or transfer differing from a reference resolution, a reference image-processing parameter set according to a reference resolution image having the reference resolution is corrected based on a difference between the reference resolution and the second resolution, so that it becomes a second parameter corresponding to the second image. The second parameter obtained by the correction is stored or transferred along with the second image.

9 Claims, 12 Drawing Sheets

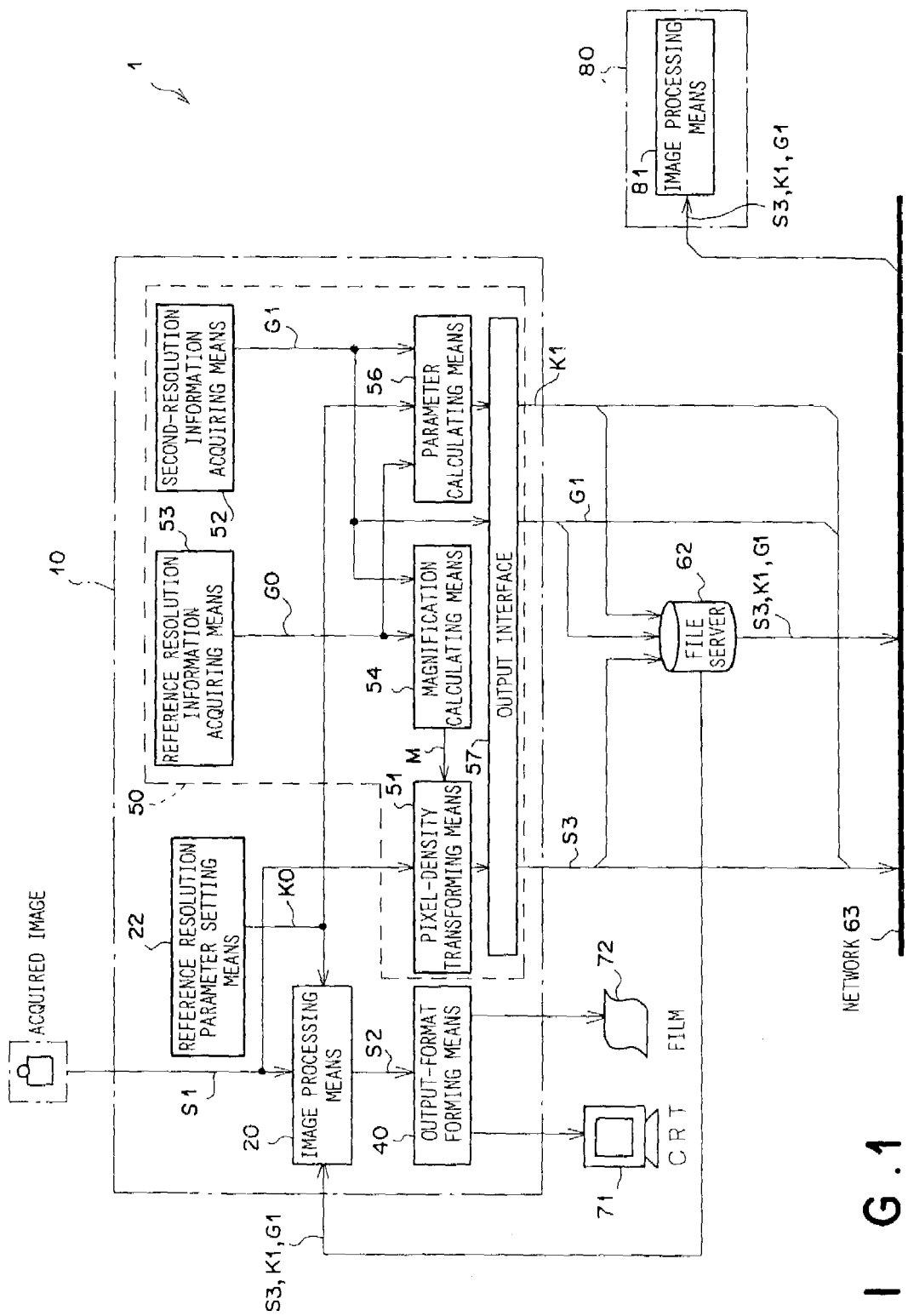
F I G. 1

FIG.7

| | | | | | | |
|---|---|---|---|---|---|---|
| REFERENCE RESOLUTION IMAGE | Sorg | Sus 1 | Sus 2 | Sus 3 | Sus 4 | Sus 5 | Sus 6 |
| 1/2 RESOLUTION IMAGE (1/2² REDUCTION IMAGE) | | Sorg | Sus 1 | Sus 2 | Sus 3 | Sus 4 | Sus 5 |
| 1/4 RESOLUTION IMAGE (1/4² REDUCTION IMAGE) | | | Sorg | Sus 1 | Sus 2 | Sus 3 | Sus 4 |
| 1/8 RESOLUTION IMAGE (1/8² REDUCTION IMAGE) | | | | Sorg | Sus 1 | Sus 2 | Sus 3 |
| 1/16 RESOLUTION IMAGE (1/16² REDUCTION IMAGE) | | | | | Sorg | Sus 1 | Sus 2 |

FIG.8

| | | | | | | | |
|---|---|---|---|---|---|---|---|
| REFERENCE RESOLUTION IMAGE | Sorg-Sus1 | Sus1-Sus2 | Sus2-Sus3 | Sus3-Sus4 | Sus4-Sus5 | Sus5-Sus6 | |
| 1/2 RESOLUTION IMAGE ($1/2^2$ REDUCTION IMAGE) | | Sorg-Sus1 | Sus1-Sus2 | Sus2-Sus3 | Sus3-Sus4 | Sus4-Sus5 | |
| 1/4 RESOLUTION IMAGE ($1/4^2$ REDUCTION IMAGE) | | | Sorg-Sus1 | Sus1-Sus2 | Sus2-Sus3 | Sus3-Sus4 | |
| 1/8 RESOLUTION IMAGE ($1/8^2$ REDUCTION IMAGE) | | | | Sorg-Sus1 | Sus1-Sus2 | Sus2-Sus3 | |
| 1/16 RESOLUTION IMAGE ($1/16^2$ REDUCTION IMAGE) | | | | | Sorg-Sus1 | Sus1-Sus2 | |

FIG.9

| | | | | | | |
|---|---|---|---|---|---|---|
| REFERENCE RESOLUTION IMAGE | f1 | f2 | f3 | f4 | f5 | f6 |
| 1/2 RESOLUTION IMAGE ($1/2^2$ REDUCTION IMAGE) | | f2 | f3 | f4 | f5 | f6 |
| 1/4 RESOLUTION IMAGE ($1/4^2$ REDUCTION IMAGE) | | | f3 | f4 | f5 | f6 |
| 1/8 RESOLUTION IMAGE ($1/8^2$ REDUCTION IMAGE) | | | | f4 | f5 | f6 |
| 1/16 RESOLUTION IMAGE ($1/16^2$ REDUCTION IMAGE) | | | | | f5 | f6 |

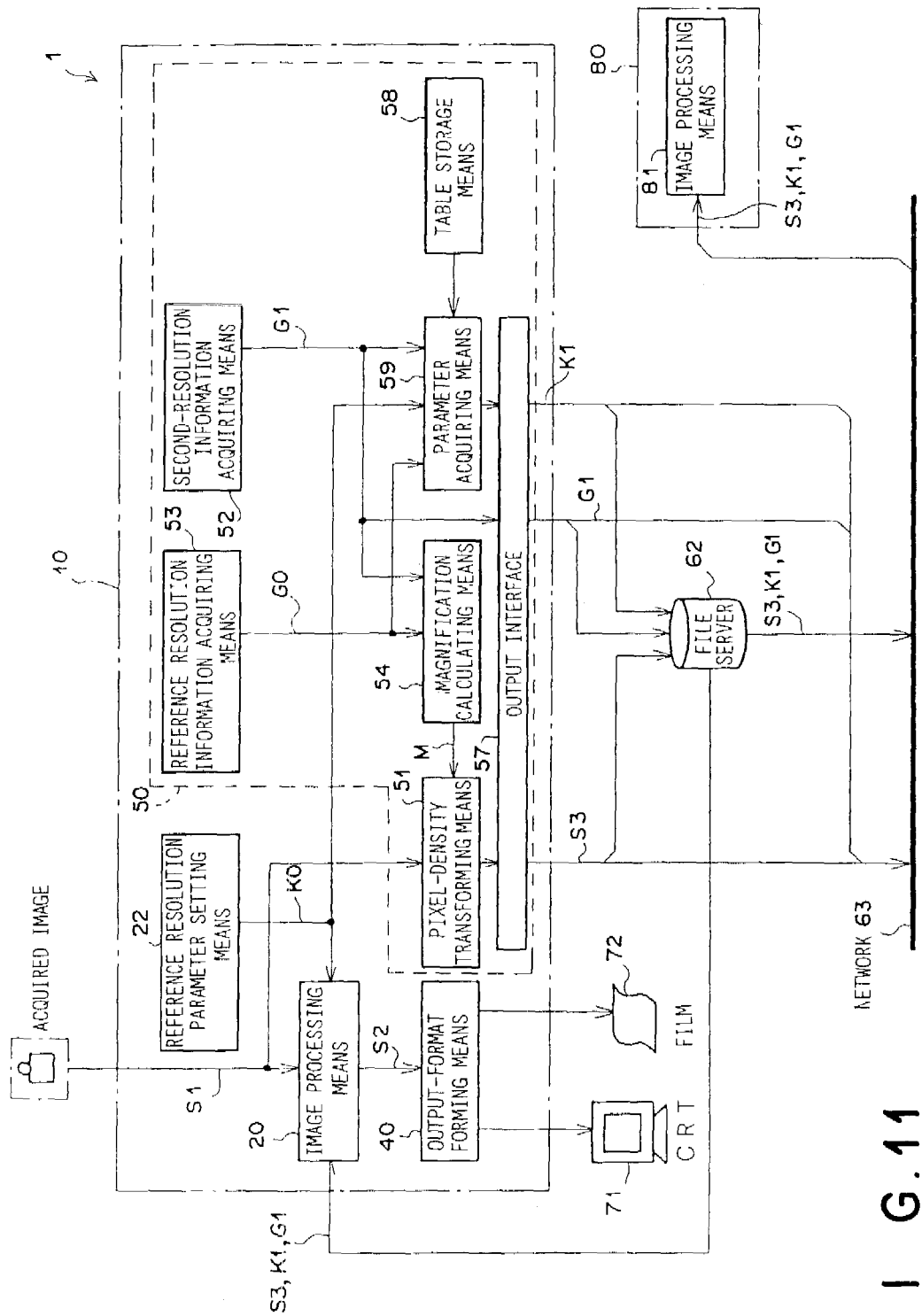
F I G. 11

IMAGE STORING-TRANSFERRING METHOD AND APPARATUS, IMAGE PROCESSING METHOD, IMAGE PROCESSING SYSTEM, AND IMAGE PROCESSOR

This is a continuation of application Ser. No. 09/774,706 filed Feb. 1, 2001 now U.S. Pat. No. 7,460,157. The entire disclosure of the prior application, application Ser. No. 09/774,706 is considered part of the disclosure of the accompanying continuation application and is hereby incorporated by reference.

BACKGROUND OF THE INVENTION

1. Field of the Invention

The present invention relates to an image storing-transferring method and apparatus, an image processing method and system taking advantage of the image storing-transferring method, and an image processor that is employed in the image processing system.

2. Description of the Related Art

In the case of handling an image acquired by a radiation image reader, etc., an image-processing parameter (hereinafter also referred to simply as a parameter) suitable for the acquired image is stored (in a storage unit) or transferred in correlation with the acquired image so that the output image becomes an image suitable for diagnosis. At the time of reproduction and output, the image and the parameter stored, etc., are read out and given an image process, whereby an optimal processed image can be obtained.

However, there are instances where in practice, an image stored, etc., has not always coincided with each resolution level of the parameter correlated with the image, for data handling convenience.

For example, there are cases where an image is read out with high density, the read high density image whose resolution level is high is printed and then transformed to a low density image whose resolution level is low, and this low density image and the parameter for the high density image (acquired image) are stored. This is for the purpose of reducing archiving costs and enhancing data handling performance, by storing a low density image, in which the number of pixels is small and the file size can be reduced.

In certain cases, high density reading is performed, but in normal handling, an image lower in resolution level than a high density image is handled as a standard image, and the aforementioned image-processing parameter has a value corresponding to the resolution level of this standard image. When reproducing and outputting a high density image, a parameter suitable for the high density image is used. As a form of storing an image and a parameter, the parameters for the high density image and the standard image are sometimes stored.

However, if image resolution is changed by pixel density transformation, etc., for example, the relationship between the pixel-density transformed image, i.e., an image differing in image resolution and the image-processing parameter set according to the resolution level of the high density image being before transformation will be broken, and therefore, the parameter will no longer be suitable for the pixel-density transformed image. As a result, if the pixel-density transformed image is processed by use of a parameter set according to the resolution level of the high density image before transformation, there are cases where the processed image is not optimal and therefore has influence on image diagnosis. Particularly, in the case where the image process employs a spatial filter, as in a frequency enhancing process and a smoothing process, this problem becomes very noticeable.

SUMMARY OF THE INVENTION

The present invention has been made in view of the problems found in the prior art. Accordingly, it is the primary object of the present invention to provide an image storing-transferring method and apparatus, an image processing method and system taking advantage of the image storing-transferring method, and an image processor to be employed in the image processing system, which are capable of employing a parameter suitable for a stored image, regardless of the resolution level of the stored image, when reading out and processing the stored image and a stored parameter.

To achieve this end, there is provided a first method of storing or transferring an image along with an image-processing parameter for processing the image, the method comprising, when storing or transferring a second image for storage or transfer which has a second resolution for storage or transfer differing from a reference resolution, the steps of:

correcting a reference image-processing parameter set according to a reference resolution image having the reference resolution, based on a difference between the reference resolution and the second resolution, so that it becomes a second parameter corresponding to the second image; and storing or transferring the second parameter obtained by the correction, along with the second image.

The second image storing-transferring method according to the present invention is a method of storing or transferring an image along with an image-processing parameter for processing the image, the method comprising, when storing or transferring a second image for storage or transfer which has a second resolution for storage or transfer differing from a reference resolution, the step of:

storing or transferring information on a reference image-processing parameter set according to a reference resolution image having the reference resolution and information on the reference resolution along with the second image.

The third image storing-transferring method according to the present invention is a method of storing or transferring an image along with an image-processing parameter for processing the image, the method comprising, when storing or transferring a second image for storage or transfer which has a second resolution for storage or transfer differing from reference resolution, the steps of:

acquiring a second parameter that corresponds to the second image, by making reference to a table in which the second resolution is correlated with the second parameter; and storing or transferring the second parameter along with the second image.

The image processing method according to the present invention is an image processing method that takes advantage of the above-mentioned second image storing-transferring method. That is, there is provided a method of storing or transferring an image along with an image-processing parameter for processing the image, and processing the stored or transferred image by use of the stored or transferred parameter, the method comprising, when storing or transferring a second image for storage or transfer which has a second resolution for storage or transfer differing from a reference resolution, the steps of:

storing or transferring information on a reference image-processing parameter set according to a reference resolution image having the reference resolution and information on the reference resolution along with the second image;

correcting the stored or transferred reference image-processing parameter, based on the stored or transferred information on the reference resolution, so that it becomes a second parameter corresponding to the stored or transferred second image; and processing the stored or transferred second image by use of the second parameter obtained by the correction.

In the above-mentioned first image storing-transferring method and image processing method, correcting "the reference parameter so that it becomes a second parameter corresponding to the second image for storage or transfer" is intended to mean to correct the reference parameter so that it becomes a parameter suitable for the resolution level of the second image (i.e., resolution for storage or transfer). For example, it means to correct the parameter so that an image characteristic (e.g., frequency response), obtained by reading out the stored second image and processing the second image by use of the corrected parameter, becomes approximately the same as an image characteristic obtained by processing the reference resolution image by use of the reference parameter.

In the third image storing-transferring method, the expression "second parameter that corresponds to the second image," as with the aforementioned first image storing-transferring method, is intended to mean a parameter obtained by correcting the reference image-processing parameter, set according to the reference resolution image, so that it becomes suitable for the resolution level of the second image. The aforementioned "table" is made by calculating second parameters that correspond to the second images of various resolutions by correcting the reference image-processing parameter, and by correlating the second resolutions with the second parameters, respectively.

The first image storing-transferring apparatus according to the present invention is an apparatus for carrying out the above-mentioned first image storing-transferring method. That is, there is provided an apparatus for storing or transferring an image along with an image-processing parameter for processing the image, the apparatus comprising:

parameter correction means for correcting a reference image-processing parameter set according to a reference resolution image having a reference resolution, based on a difference between the reference resolution and a second resolution for storage or transfer differing from the reference resolution, so that it becomes a second parameter corresponding to a second image for storage or transfer which has the second resolution; and means for storing or transferring the second parameter obtained by the correction, along with the second image.

The second image storing-transferring apparatus according to the present invention is an apparatus for carrying out the above-mentioned second image storing-transferring method. That is, there is provided an apparatus for storing or transferring an image along with an image-processing parameter for processing the image, the apparatus comprising:

means for storing or transferring information on a reference image-processing parameter set according to a reference resolution image having a reference resolution and information on the reference resolution, along with a second image for storage or transfer which has a second resolution for storage or transfer differing from the reference resolution.

The third image storing-transferring apparatus according to the present invention is an apparatus for carrying out the above-mentioned third image storing-transferring method. That is, there is provided an apparatus for storing or transfer ring an image along with an image-processing parameter for processing the image, the apparatus comprising:

storage means for storing a table in which a second resolution of a second image for storage or transfer differing from reference resolution is correlated with a second parameter;

parameter acquiring means for acquiring the second parameter by making reference to the table; and means for storing or transferring the acquired second parameter along with the second image.

The image processing system according to the present invention is an image processing system utilizing the above-mentioned image storing-transferring method. That is, there is provided a system for storing or transferring an image along with an image-processing parameter for processing the image and processing the stored or transferred image by use of the stored or transferred parameter, the system comprising:

means for storing or transferring information on a reference image-processing parameter set according to a reference resolution image having a reference resolution and information on the reference resolution, along with a second image for storage or transfer which has a second resolution for storage or transfer differing from the reference resolution;

parameter correction means for correcting the stored or transferred reference image-processing parameter, based on the stored or transferred information on the reference resolution, so that it becomes a second parameter corresponding to the stored or transferred second image; and means for processing the stored or transferred second image by use of the second parameter obtained by the correction.

The image processor according to the present invention is an image processor that constitutes the aforementioned image processing system. That is, there is provided an image processor comprising:

parameter correction means for correcting a stored or transferred reference image-processing parameter, based on stored or transferred information on reference resolution, so that it becomes a second parameter corresponding to a stored or transferred second image for storage or transfer; and means for applying a predetermined image process on the stored or transferred second image by use of the second parameter obtained by the correction.

According to the first image storing-transferring method and apparatus, the reference image-processing parameter, set according to a reference resolution image having the reference resolution, is corrected based on a difference between the reference resolution and the second resolution, when storing or transferring the second image for storage or transfer which has a second resolution for storage or transfer differing from reference resolution, so that it becomes a second parameter corresponding to the second image. Also, the second parameter obtained by the correction is stored or transferred along with the second image. Therefore, the second image for storage or transfer can be processed by use of the corrected parameter, i.e., a parameter suitable for the second image, and an appropriate image can always be obtained regardless of the resolution level of the second image. In addition, the second image can be immediately reproduced and output, because the parameter suitable for the second image has already been calculated at the time of reproduction and output.

According to the second image storing-transferring method and apparatus, and to the image processing method, system, and apparatus utilizing the second image storing-transferring method, the reference image-processing parameter set according to a reference resolution image having the reference resolution, and the information on the reference resolution are stored or transferred along with the second image when storing or transferring the second image for storage or transfer which has a second resolution for storage or transfer differing from a reference resolution. Therefore, a parameter suitable for the second image can be calculated based on the stored or transferred information on the reference image-processing parameter and information on the reference resolution, independently of the resolution level of the second image. As a result, an appropriate image can be obtained at all times by processing the second image by use of the calculated parameter.

According to the third image storing-transferring method and apparatus of the present invention, when storing or transferring the second image for storage or transfer which has a second resolution for storage or transfer differing from reference resolution, a second parameter corresponding to the second image is acquired by making reference to the table, and the acquired second parameter is stored or transferred, along with the second image. Therefore, the second image can be given image processing by use of the acquired second parameter, i.e., a parameter suitable for the second image, and an appropriate image can be obtained at all times, regardless of the resolution level of the second image. In addition, the calculating time for acquiring the second parameter can be shortened because the second parameter can be acquired only by referring to the table. Furthermore, the second image can be immediately reproduced and output, since the second parameter has already been obtained when reproducing and outputting the second image.

BRIEF DESCRIPTION OF THE DRAWINGS

The present invention will be described in further detail with reference to the accompanying drawings wherein:

FIG. 1 is a block diagram showing an image processing system equipped with an image storing-transferring section according to a first embodiment of the present invention;

FIG. 7 is a diagram showing the corresponding relationship between the 6 (six) blurred image signals obtained from the reference resolution image and the blurred image signals obtained from the low-resolution images ranging from the minimum resolution to a frequency band nearest a predetermined resolution;

FIG. 8 is a diagram showing the corresponding relationship between (1) the 6 (six) blurred image signals obtained from the reference resolution image and (2) the original images based on low resolution images, and the low-resolution band-limited image signals obtained from blurred image signals;

FIG. 9 is a diagram showing the corresponding relationship of transform functions in the reference resolution image and each resolution image.

FIG. 11 is a block diagram showing an image processing system equipped with an image storing-transferring section according to a third embodiment of the present invention.

DESCRIPTION OF THE PREFERRED EMBODIMENTS

Figure 2:
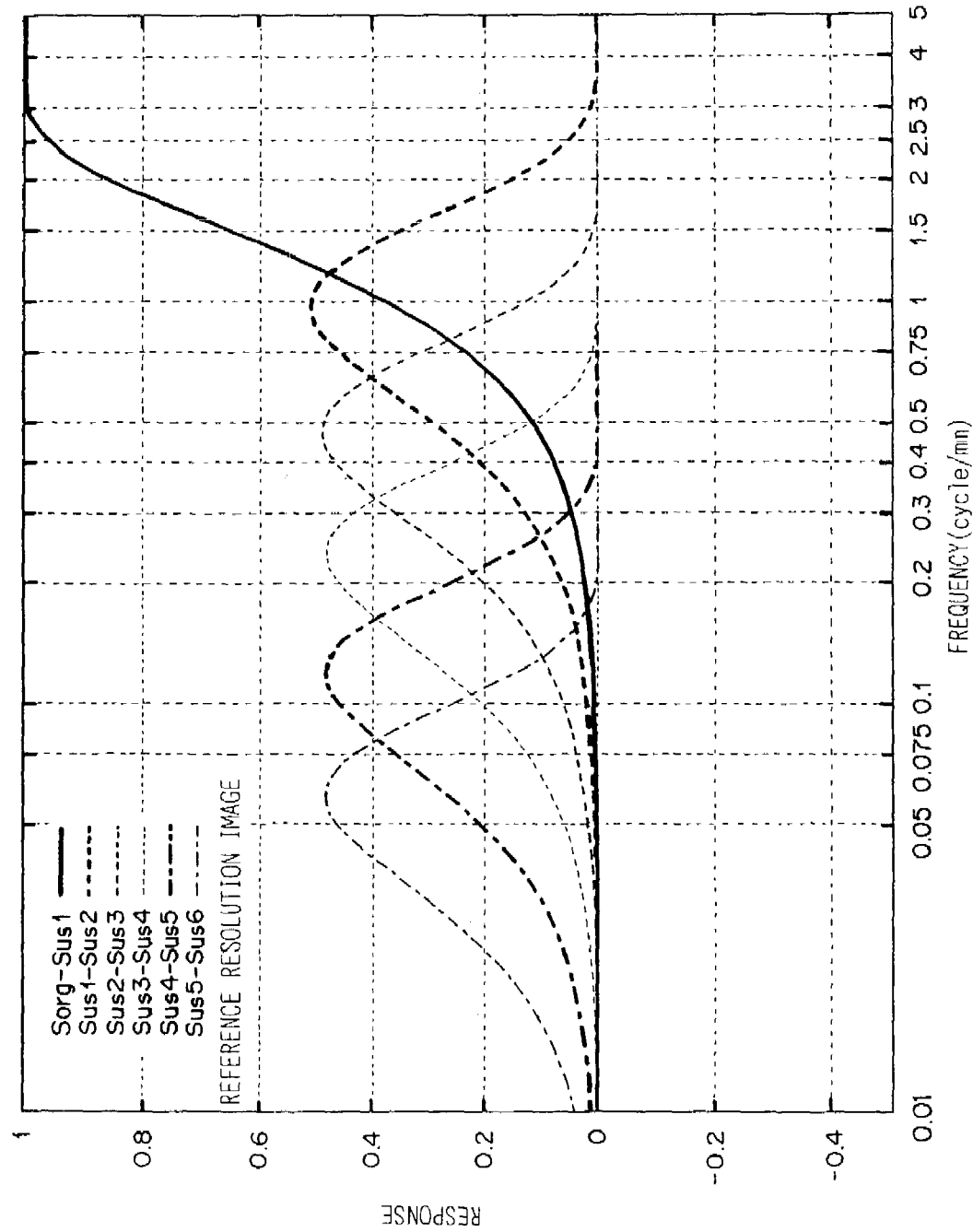
FIG. 2 is a graph showing the frequency response characteristics of band-limited image signals for reference resolution image.

Referring now in greater detail to the drawings and initially to FIG. 1, there is shown an image processing system to which an image storing-transferring apparatus according to a first embodiment of the present invention is applied. This image processing system 1 applies a frequency enhancing process or dynamic range compressing process to an image, acquired by reading the radiation image of a human body recorded on a storage-type fluorescent sheet, so that the acquired image is reproduced and output in desired layout (output size, disposition, etc.) on a CRT monitor 71, or so that an output image recorded on film by a file output unit 72 becomes an image suitable for diagnosis. Note that in the description of the first embodiment, the resolution of the acquired image read out by a reader (not shown) is handled as reference resolution and the acquired image as a reference resolution image.

As shown in FIG. 1, the image processing system 1 includes image processors 10, 80, a film sever 62, and a network 63 in addition to the CRT monitor 71 and the film output unit 72.

The image processor 10 has image processing means 20 for obtaining a processed image signal S2 by applying a predetermined image process to an image signal S1, which represents a high density image (hereinafter handled as a reference resolution image) obtained with a reader, etc. (not shown) by high-density reading, by the use of a set reference image-processing parameter K0; reference resolution parameter setting means 22 for setting the reference image-processing parameter K0, which is employed in processing the reference resolution image, in the image processing means 20; output format forming means 40 for forming a desired output format by use of the processed image signal S2 so that the processed image is reproduced and output in the desired output format; and image storing-transferring section 50 for storing an image in the file server 62 or transferring the image to an outside unit through the network 63.

The image storing-transferring section 50 has (1) pixel-density transforming means 51 for giving a pixel-density transforming process to the image signal S1 with a set magnification of M; (2) second-resolution information acquiring means 52 for acquiring second-resolution information G1 for specifying information on the resolution of an image to be stored or transferred (hereinafter referred to as the second resolution), such as information on the second resolution itself, information on the magnification between reference resolution and the second resolution, etc.; (3) reference resolution information acquiring means 53 for acquiring information G0 on the reference resolution correlated with reference resolution image; (4) magnification calculating means 54 for calculating the magnification M of the pixel density transformation in the pixel-density transforming means 51, based on the reference resolution information G0 and the second-resolution information G1; (5) parameter calculating means 56, as parameter correction means according to the present invention, for calculating an image-processing parameter K1 suitable for the second resolution by correcting the reference image-processing parameter K0, based on the reference resolution information G0, the second-resolution information G1, and the reference image-processing parameter K0 correlated with the reference resolution image; and (6) an output interface 57 as means for storing or transferring the image signal S3 output from the pixel-density transforming means 51, the second-resolution information G1 acquired by the second-resolution acquiring means 52, and the parameter K1 calculated by the parameter calculating means 56.

For the acquisition of the reference resolution information G0 by the reference resolution information acquiring means 53, the user may input a numerical value from the keyboard, or select one of the numerals representing resolution displayed on the control screen. Instead, in a reader, etc., the reference resolution information G0 may be attached to the image signal S1 as the accessory information, and the reference resolution information G0 attached to the input image signal S1 may be recognized. Any method may be adopted, as long as the reference resolution information acquiring means 53 acquires the reference resolution information G0.

Similarly, for the acquisition of the reference image-processing parameter K0 by the reference resolution parameter setting means 22, and the acquisition of the second-resolution information G1 by the reference resolution information acquiring means 52, a similar method to the aforementioned acquisition method of the reference resolution information G0 by the reference resolution information acquiring means 53 can be employed.

Now, the operation of the image processing system 1 will be described in detail.

The image signal S1, acquired by the reader (not shown), etc., is input to the image processing means 20 of the image processor 10. The reference resolution parameter setting means 22 sets the reference image-processing parameter K0 to the image processing means 20 and the parameter calculating means 56. The image processing means 20 processes the image signal S1 by the use of the set reference image-processing parameter K0 and inputs the processed image signal S2 to the output-format forming means 40. In this manner, an image of the same resolution level and image size as the reference resolution image (acquired image) is reproduced and output at the CRT monitor 71, etc. The reproduced image is to be employed for diagnosis.

Next, a description will be given of the image storing-transferring method. In this embodiment, in order to reduce archiving costs and enhancing data handling performance, a high density image with a high resolution level (i.e., a reference resolution image) read out by the reader (not shown) is first reproduced and output. Then, the high density image is transformed to a low density image whose resolution level is low, and this low density image is stored and transferred.

In such a case, in the pixel-density transforming means 51 a pixel-density transforming process is first applied to the reference resolution image with the magnification M set by the magnification calculating means 54, in order to transform the reference resolution image to a low density image.

The magnification M is calculated in the following manner by the magnification calculating means 54. First, the second-resolution information G1 is acquired by the second-resolution information acquiring means 52, and the reference resolution information G0 is acquired by the reference resolution information acquiring means 53. The acquired reference resolution information G0 and second-resolution information G1 are input to the magnification calculating means 54 and the parameter calculating means 56, respectively.

The magnification calculating means 54 calculates the magnification M (relating to resolution level), based on the input second-resolution information CI and reference resolution information G0. For instance, when it is set that the second resolution is one-fourth the reference resolution (the stored image size is $1/4^2$ of the reference resolution image), the magnification M is set to $1/4$. Also, when the image size of the second-resolution image is set to 1280×1280 pixels, in the case where the image size of the reference resolution image is 2560×2560 pixels, the magnification M is set to $1/2 (= {}^{1240}/_{2560})$.

Since the magnification M calculated by the magnification calculating means 54 is input to the pixel-density transforming means 51, the pixel-density transforming means 51 generates an image of the resolution level corresponding to this magnification M. For example, when M=$1/2$, it generates a scaled-down image of $1/2$ resolution and $1/2^2$ size. The pixel-density transforming means 51 inputs an image signal S3 representing the scaled-down image to the file server 62, or transfers the image signal S3 through the network 63. Note that the image signal S3 stored temporarily in the file server 62 may be transferred through the network 63.

Here, if the scaled-down image read out from the file server 62 is subjected to an image process by the use of the reference image-processing parameter K0 for the reference resolution image, there will arise a problem that the image characteristic of the scaled-down image processed will not always coincide with that of the reference resolution image processed by the use of the reference image-processing parameter K0.

To solve the above problem, the parameter calculating means 56 in the first embodiment, provided in the image storing-transferring section 50, calculates the image-processing parameter K1 suitable for the second resolution, regardless of the resolution (second resolution) of an image to be stored in the file server 62 or transferred through the network 63, based on the input second-resolution information G1 and reference resolution information G0, and the reference image-processing parameter K0 correlated with the reference resolution image. The parameter calculating means 56 also stores the calculated image-processing parameter K1 in the file sever 62 in correlation with the scaled-down image, or transfers the parameter K1 to an outside unit (in FIG. 1, image processor 80) through the network 63.

A brief description will hereinafter be given of how the parameter calculating means 56 calculates the image-processing parameter K1 suitable for the second resolution. This process has been proposed in Japanese Patent Application No. 2000-17107 by the applicant of this application. In the first embodiment, the frequency enhancing process employing band-limited image signals, described in the Japanese Unexamined Patent Publication No. 10(1988)-75395 by the applicant of this application, is performed as the image process. In this case, the image processing means 20 also functions as a means of applying the image process to the scaled-down image read out from the file server 62. Note that the image processor 80 is equipped with image processing means 81 of the same construction as the image processing means 20 so that it can apply the image process to the scaled-down image transferred.

Figure 3:
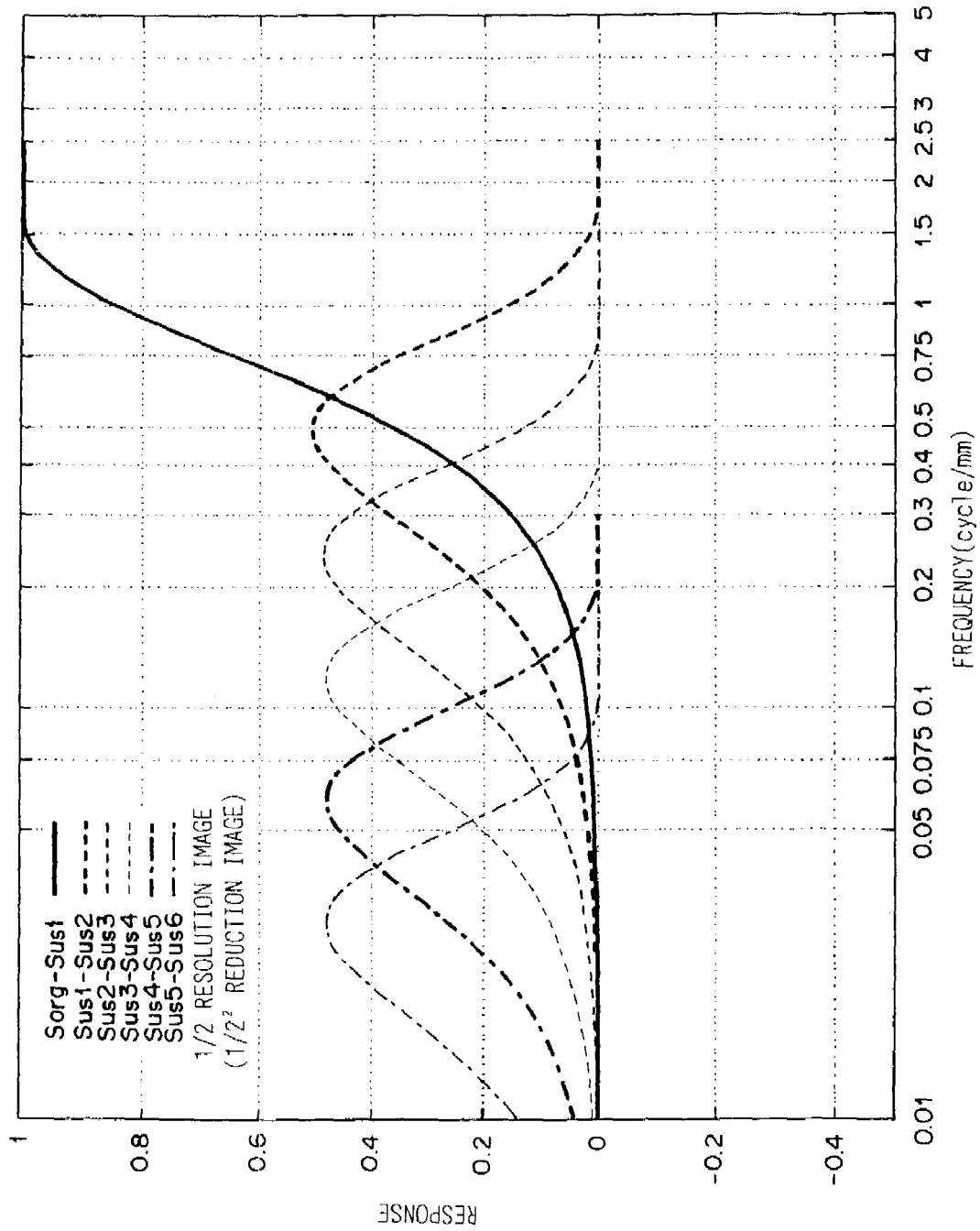
FIG. 3 is a graph showing the frequency response characteristics of band-limited image signals for a ½-resolution image.

The image processing means 20 provided in the image processor 10 generates a plurality of band-limited image signals and blurred image signals (non-sharpness mask image signals), based on the image signal S1. The reference resolution parameter setting means 22 sets reference transform functions $f_1$ to $f_N$ (one form of the reference image-processing parameter), corresponding to the band-limited image signals for the reference resolution image, in the image processing means 20 and the parameter calculating means 56. For example, in the case of obtaining band-limited image signals from an original image signal $S_{org}$ (=S1) which represents the reference resolution image read out with a reading density of 10 scan/mm (reference resolution), the Nyquist frequency of the original image signal $S_{org}$ is 5 cycle/mm. As shown in FIG. 2, the peak frequency of the band-limited image signal in the maximum frequency band becomes this Nyquist frequency 5 cycle/mm, and the peak frequency of the band-limited image signal in the second maximum frequency band becomes 1.0 cycle/mm, which has a value of one-fifth of the Nyquist frequency. Thereafter, as the frequency band becomes a lower frequency band, the peak frequency becomes one-half the previous peak frequency, like 0.5 cycle/mm, 0.25 cycle/mm, 0.12 cycle/mm, and 0.06 cycle/mm. Also, when an image signal representing an image of one-half the resolution of the reference resolution image is taken to be an original image signal $S_{org}$, the peak frequencies of the band-limited image signals become 2.5 cycle/mm, 0.5 cycle/mm, 0.25 cycle/mm, 0.125 cycle/mm, and 0.06 cycle/mm, as shown in FIG. 3.

Figure 4:
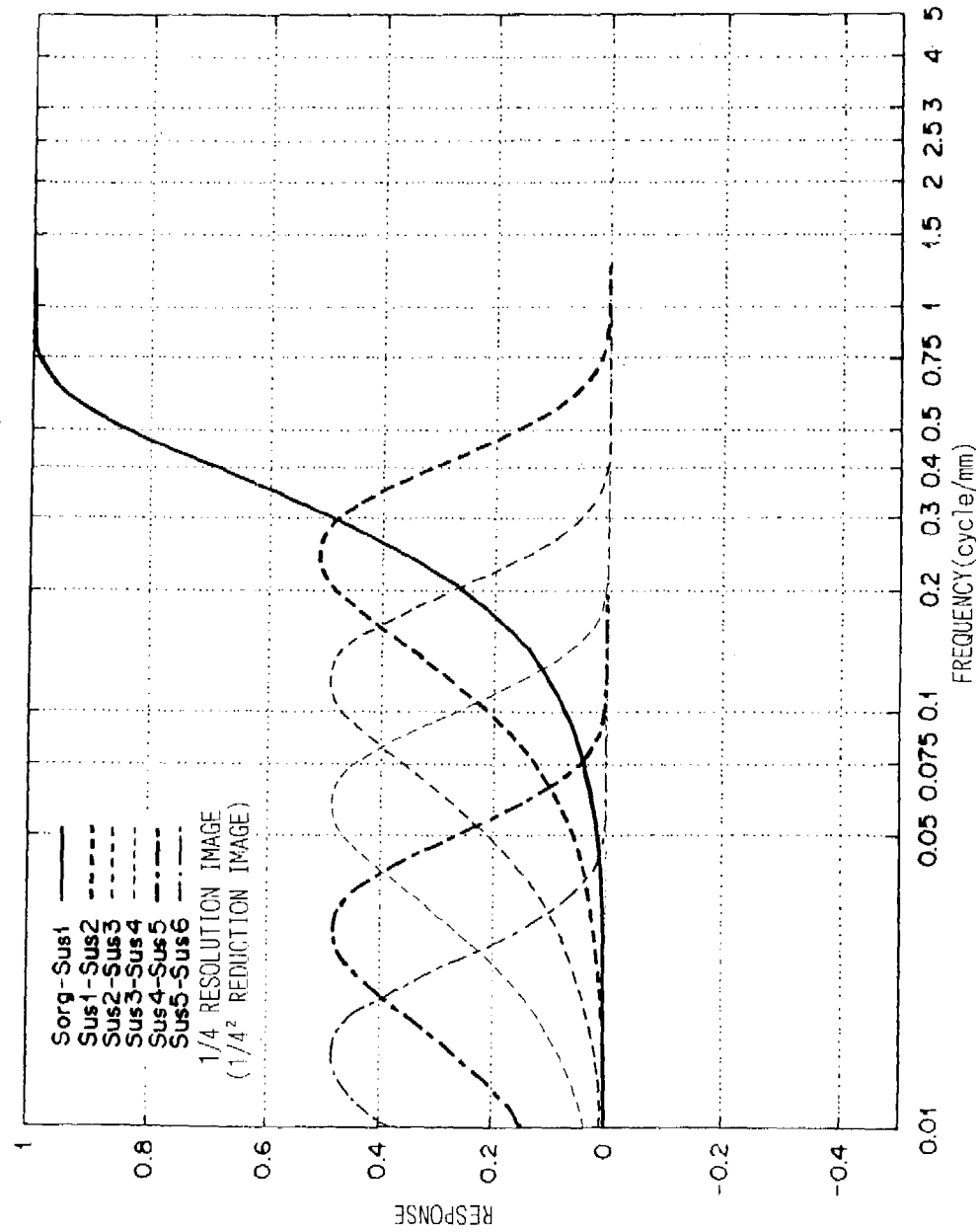
FIG. 4 is a graph showing the frequency response characteristics of band-limited image signals for a ¼-resolution image.
Figure 5:
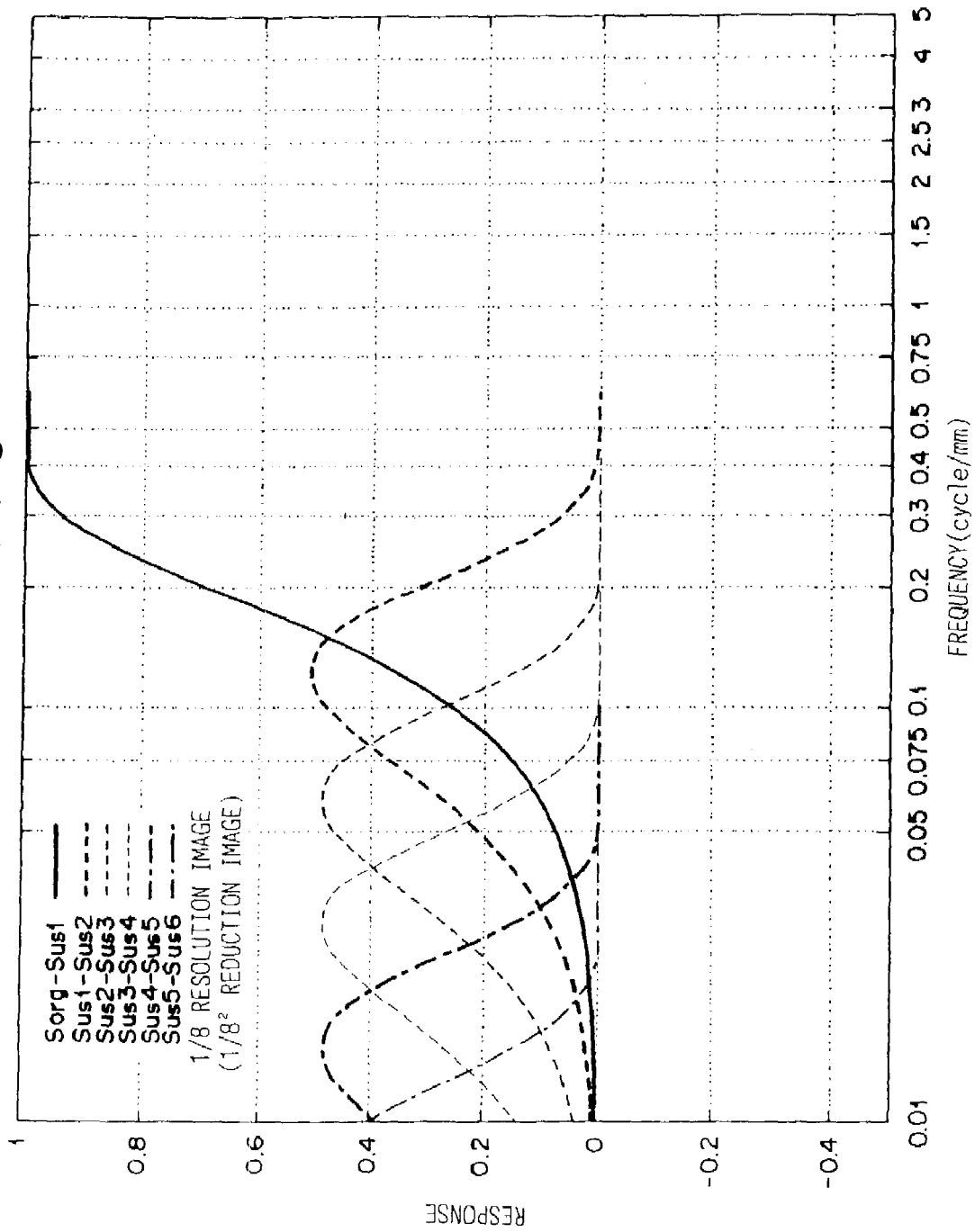
FIG. 5 is a graph showing the frequency response characteristics of band-limited image signals for a ⅛-resolution image.
Figure 6:
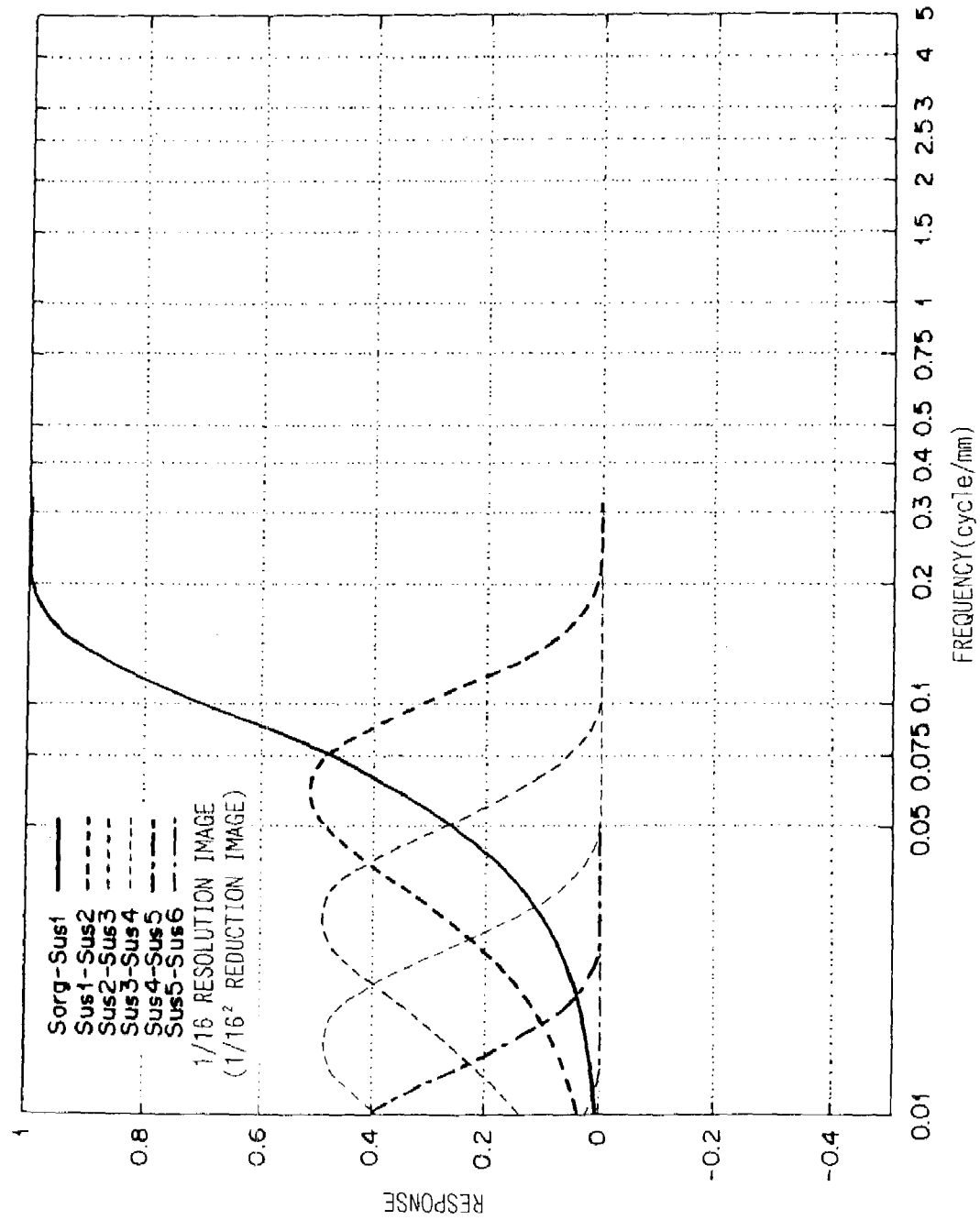
FIG. 6 is a graph showing the frequency response characteristics of band-limited image signals for a 1/16-resolution image.

When image signals representing images of resolutions of ¼, ⅛, and ¹⁄₁₆ of the reference resolution image are assumed to be original image signals $S_{org}$, the peak frequencies of the band-limited image signals become such as shown in FIGS. 4 through 6. That is, the peak frequency of the band-limited image signal in the maximum frequency band, among band-limited image signals, becomes the Nyquist frequency corresponding to the resolution level, and the peak frequency of the band-limited image signal in the second maximum frequency band becomes one-fifth the Nyquist frequency. Thereafter, as the frequency band becomes a lower frequency band, the peak frequency becomes one-half the previous peak frequency.

Here, the corresponding relationship between the blurred image signals $S_{org}$ to $S_{us6}$ ($S_{org}$=S1) obtained in the image processing means 20 of the image processor 10 and the blurred image signals $S_{org}$ to $S_{us5}$ obtained from an image signal representing a scaled-down image read out from the file server 62 is shown in FIG. 7 so that the blurred image signals in the same frequency range are in the same column. Note that in FIG. 7, the corresponding relationship between an original image signal $S_{org}$ and blurred image signals $S_{usk}$ is also shown from a ¼ resolution image (¼² reduction image) to a ¹⁄₁₆ resolution image (¹⁄₁₆² reduction image). As shown in FIG. 7, the blurred image signal $S_{us1}$ in the reference resolution image corresponds, for example, to the blurred image signal $S_{org}$ in the ½ resolution image. Similarly, the corresponding relationship moves relatively to the right side of FIG. 7, such that $S_{us2}$, $S_{us3}$, $S_{us4}$, and $S_{us6}$ in the reference resolution image correspond to $S_{us1}$, $S_{us2}$, $S_{us3}$, and $S_{us5}$ in the ½ resolution image, respectively.

In addition, the corresponding relationship between the 6 (six) band-limited image signals ($S_{org}$-$S_{us1}$, $S_{usk}$-$S_{usk+1}$ where k is an integer) obtained from the reference resolution image signal and the low-resolution band-limited image signals obtained from the low resolution image signal representing each resolution image is shown in FIG. 8 so that the band-limited image signals in the same frequency range are in the same column. The low-resolution band-limited image signals in the low frequency band of 0.03 cycle/mm or less, among the low-resolution band-limited signals generated in the case of employing a scaled-down image, are not used in the process of enhancing the reference resolution image, because they are signals in a frequency range which is not used in the enhancing process. This is why the low-resolution band-limited image signals in the low frequency band of 0.03 cycle/mm or less are not shown for ½ to ¹⁄₁₆ resolution images in FIGS. 7 to 9.

On the other hand, the parameter calculating means 56 calculates a transform function $f_k$ corresponding to each low-resolution band-limited image signal. For the band-limited image signals obtained from the reference resolution image signal, transform functions $f_1$ to $f_6$ are employed as the reference image-processing parameter, as described above. However, for the low-resolution band-limited image signals obtained from the low resolution image signal representing the ½ resolution image (½² reduction image), the parameter K1 for the ½ resolution image is calculated by shifting (or relatively moving) the reference transform function $f_1$ to $f_6$ so that the peak wavelength of the low-resolution band-limited image signal corresponding to a transform function to be set becomes the same as the wavelength of the band-limited image signals obtained from the reference resolution image signal.

The corresponding relationship of the transform functions in each resolution image is shown in FIG. 9. As shown in FIG. 8, the peak wavelength of the band-limited image signal $S_{us1}$-$S_{us2}$ in the reference resolution image, for example, becomes the same as that of the low-resolution band-limited image signal $S_{org}$-$S_{us1}$ in the ½ reference resolution image. This relationship moves relatively to the right side of FIG. 8. Therefore, as shown in FIG. 9, when the resolution of a low resolution image to be processed becomes $½^k$ of the reference resolution, the transform function $f_N$ for the low resolution image employs k transform functions, on the lower frequency band side, of the reference transform functions $f_1$ to $f_6$.

With the above relationship, if an integration signal $F_{usm0}$ in the case of applying the frequency enhancing process to the reference resolution image is shown in Eq. (1), a low-resolution integration signal $F_{usm1}$ in the case of applying the frequency enhancing process to the ½ resolution image is shown in Eq. (2):

$$F_{usm0}(S_{org}, S_{us1}, S_{us2}, \ldots S_{us6}) = \qquad (1)$$
$$f_1(S_{org} - S_{us1}) + f_2(S_{us1} - S_{us2}) + \ldots + f_5(S_{us4} - S_{us5}) + f_6(S_{us5} - S_{us6})$$

$$F_{usm1}(S_{org}, S_{us1}, S_{us2}, \ldots S_{us5}) = \qquad (2)$$
$$f_2(S_{org} - S_{us1}) + f_3(u_{s1} - S_{us2}) + \ldots + f_4(S_{us3} - S_{us4}) + f_5(S_{us4} - S_{us5})$$

where $f_k$ (i.e., $f_1$ to $f_6$) is a function of transforming each band-limited image signal.

The transform functions $f_1$ to $f_5$, calculated in this manner, which are the image-processing parameter K1 suitable for the second resolution, are stored in the filter server 62 in correlation with the stored image, along with the second-resolution information G1, or are transferred to an outside unit (in FIG. 1 the image process 80) through the network 63.

In the case where, in the image processing means 20 of the image processor 10, an image with an enhanced high frequency component is reproduced by the use of the image signal S3, read out from the file server 62, which represents a ½ resolution image, the low-resolution integration signal $F_{usm1}$ is calculated based on the aforementioned Eq. (2) by the use of the image-processing parameter K1 (i.e., transform functions $f_1$ to $f_5$) read out from the file server 62. Then, as shown in Eq. (3), the low-resolution integration signal $F_{usm1}$ is multiplied by an enhancement coefficient β1 ($S_{org}$) and is added to the original signal $S_{org}$ (in this example, the ½ resolution image signal S3 read out from the file server 62), whereby a processed image signal $S_{proc}$ (=S2) is generated. This processed image signal $S_{proc}$ represents an image (½² reduction image) having the ¼ image size and ½ resolution of the reference resolution image.

$$S_{proc} = S_{org} + \beta 1(S_{org}) \times F_{usm1}(S_{org}, S_{us1}, U_{us2}, \ldots S_{us5}, \ldots \quad (3)$$

where β1 ($S_{org}$) is the enhancement coefficient, dependent on the ½ resolution, which is determined based on the second-resolution information.

In the case where an image with an enhanced high frequency component is reproduced by the use of the reference resolution image, the low-resolution integration signal $F_{usm1}$ is multiplied by an enhancement coefficient β0 ($S_{org}$) and is added to the original signal $S_{org}$ (in this example, the reference resolution image signal), as shown in Eq. (4). In this manner, a processed image signal $S_{proc}$ is generated.

$$S_{proc} = S_{org} + \beta 0(S_{org}) \times F_{usm1}(S_{org}, S_{us1}, S_{us2}, \ldots S_{us6}) \quad (4)$$

in which β0 ($S_{org}$) is the enhancement coefficient, dependent on the reference resolution image, that is determined based on the reference resolution information.

Furthermore, in the event that, in the image processor 80 connected to the network 63, an image with an enhanced high frequency component is reproduced with the ½ resolution image transferred, in the image processor 81 the frequency enhancing process is applied in the same manner as the aforementioned Eqs. (2) and (3).

Thus, in the first embodiment, when storing or transferring an image (in this example, a scaled-down image) which has a resolution level (image size) different from the reference resolution image, the image-processing parameter K1 suitable for the second resolution is calculated by correcting the reference image-processing parameter K0 employed for the reference resolution image, and the calculated image-processing parameter K1 is stored or transferred along with the scaled-down image. Therefore, regardless of the second resolution level, the image characteristic of the scaled-down image processed can be rendered approximately the same as that of the processed reference resolution image. In addition, a scaled-down image can be immediately reproduced and output, because the image-processing parameter K1 suitable for the scaled-down image has previously been calculated.

Besides, the necessity for preparing the image-processing parameter for each second resolution level is eliminated, since the image-processing parameters for reconstructing images have been calculated by correcting the reference image-processing parameter for the reference resolution image. This can make the construction of a system employing the present invention simpler and also eliminate a troublesome operation of managing image-processing parameters.

Furthermore, in the event of making the image size of an output image smaller than that of the reference resolution image, an image to be processed becomes a scaled-down image whose number of pixels is smaller than that of the reference resolution image, and a predetermined process such as an enhancing process, etc., can be applied to this scaled-down image, and consequently, the time for calculating the predetermined process can be shortened.

Figure 10:
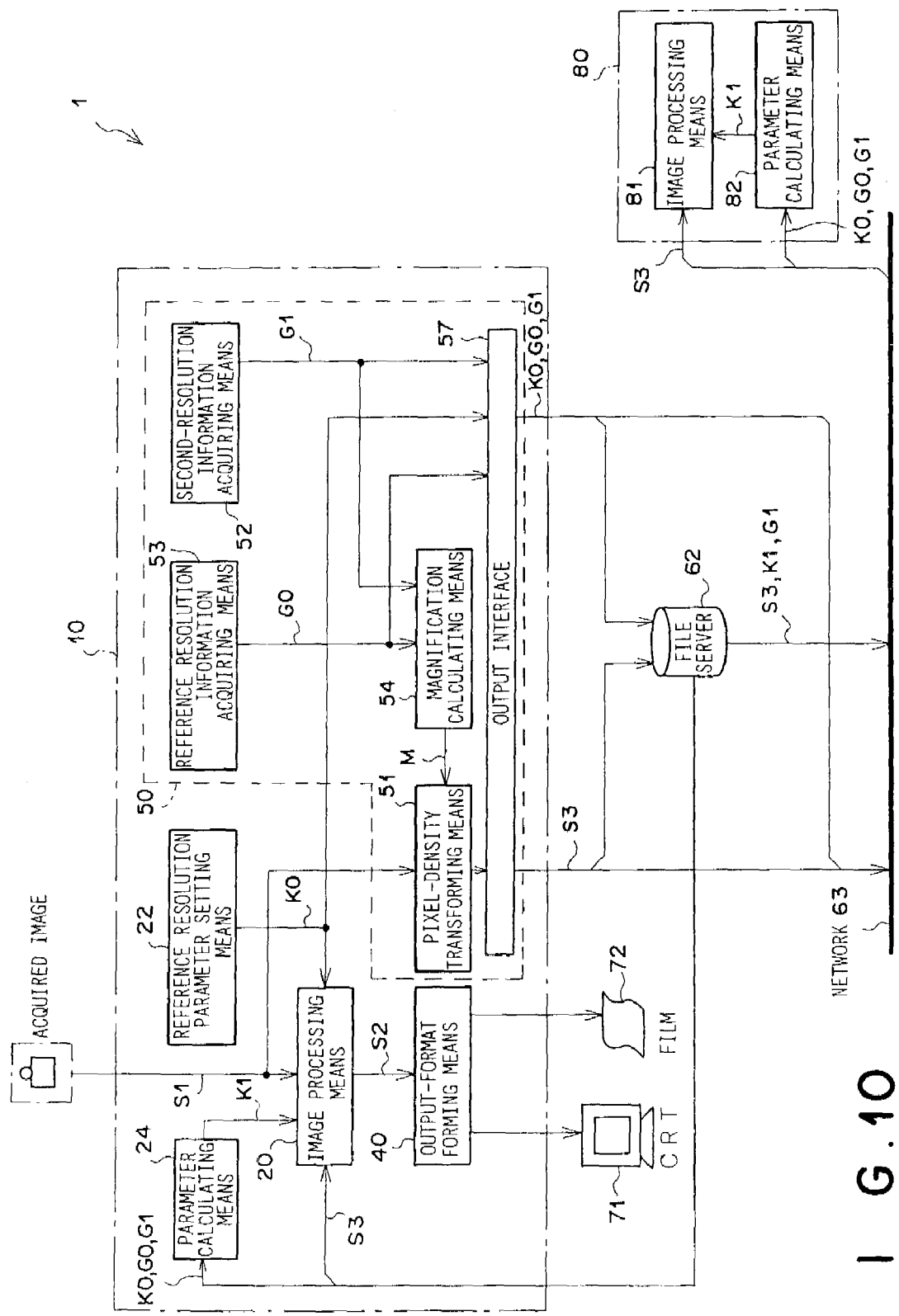
FIG. 10 is a block diagram showing an image processing system equipped with an image storing-transferring section according to a second embodiment of the present invention.

FIG. 10 illustrates the construction of an image processing system to which an image storing-transferring apparatus according to a second embodiment of the present invention is applied.

In the first embodiment, the parameter K1, which corresponds to the resolution level of a scaled-down image obtained by pixel density transformation, is calculated and the calculated parameter K1 and the scaled-down image are correlated with each other and are stored or transferred. However, this second embodiment differs in that the reference image-processing parameter K0 for the reference resolution image, and the resolution information (reference resolution information G0) are stored or transferred in correlation with the scaled-down image and that the parameter K1 corresponding to the resolution level of the scaled-down image is calculated at the time of image output. That is, in the image storing-transferring section 50 of the second embodiment, as shown in FIG. 10, the parameter calculating means 56 in the first embodiment is removed and an output interface 57 functions as a means of storing second-resolution information G1, reference resolution information G0, and a reference image-processing parameter K0 in a file server 62, or transferring them to an outside unit through a network 63. In an image processor 10, parameter calculating means 24 is provided near image processing means 20. Similarly, in an image processor 80, parameter calculating means 82 is provided in the vicinity of image processing means 81. The basic operation of the parameter calculating means 24, 82 is the same as that of the parameter calculating means 56 of the first embodiment.

The parameter calculating means 24 of the image processor 10, independently of the resolution (second resolution) of an image stored in the file server 62, calculates transform functions $f_1$ to $f_5$, which are the image-processing parameter K1 suitable for the second resolution, based on the second resolution information G1, reference resolution information G0, and reference image-processing parameter K0 read out from the file server 62, and sets the calculated parameter K1 (i.e., transform functions $f_1$ to $f_5$) in the image processing means 20.

In the case where, in the image processing means 20 of the image processor 10, a scaled-down image with an enhanced high frequency component is reproduced with the image signal S3, read out from the file server 62, which represents the ½ resolution image, the low-resolution integration signal $F_{usm1}$, is calculated based on the aforementioned Eq. (2) by the use of the image-processing parameter K1 (i.e., transform functions $f_1$ to $f_5$) set by the parameter calculating means 24. Then, as shown in the aforementioned Eq. (3), the low-resolution integration signal $F_{usm1}$ is multiplied by an enhancement coefficient β ($S_{org}$) and is added to the original signal $S_{org}$ (in this example, the ½ resolution image signal S3 read out from the file server 62), whereby a processed image signal $S_{proc}$ (=S2) is generated.

In the event that, in the image processor 80 connected to the network 63, a scaled-down image with an enhanced high frequency component is reproduced with the ½ resolution image transferred, the parameter calculating means 82 of the same construction as the parameter calculating means 24, provided in the image processor 80, calculates transform functions $f_1$ to $f_5$, which are the image-processing parameter K1 suitable for the resolution (second resolution) of the transferred image, based on the transferred second resolution information reference resolution information G0, and reference image-processing parameter K0, regardless of the resolution of the transferred image (second resolution), and sets the calculated image-processing parameter K1 (i.e., transform functions $f_1$ to $f_5$) in the image processing means 81. Thereafter, in the image processing means 81 the frequency enhancing process is applied in the same manner as the aforementioned Eqs. (2) and (3).

Therefore, the second embodiment, as with the first embodiment, is capable of making the image characteristic of the processed scaled-down image approximately the same as that of the processed reference resolution image, regardless of the second resolution level. In addition, the second embodiment has the effect of eliminating the troublesome operation of managing image-processing parameters.

FIG. 11 illustrates the construction of an image processing system to which an image storing-transferring unit according to a third embodiment is applied.

While, in the first embodiment, the parameter calculating means 56 calculates the parameter K1 which corresponds to the resolution level of a reduced image obtained by pixel density transformation, the third embodiment differs in that the processing parameter K1 is acquired by making reference to a table in which the resolution of a reduced image is correlated with the parameter K1. That is, as shown in FIG. 11, in the image storing-transferring section 50 of the image processing unit 10 of the third embodiment, the parameter calculating means 56 of the first embodiment is replaced with table storage means 58 and parameter acquiring means 59. The table storage means 58 is used for storing a table T in which the resolutions of reduced images for a great variety of sizes are correlated with the parameters K1 corresponding to the resolution levels of the reduced images. The parameter acquiring means 59 is used to acquire a processing parameter K1 by making reference to the table T, based on the reference resolution parameter K0, reference resolution information G0, and second-resolution information G1.

Figure 12:
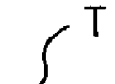
FIG. 12 is a diagram showing a table that represents the relationship between resolutions and image-processing parameters.

FIG. 12 shows an example of the table T stored in the table storage means 58. As shown in the figure, this table T correlates various resolutions with processing parameters K1, respectively. For example, in the table T, parameters A (A1, A2, . . . ) are set so that when images of resolution levels are given image processing in accordance with corresponding parameters, the processed images become approximately the same in image characteristic, even when the resolution levels differ from each other. Other parameters such parameters B, etc., are set so that the image characteristics of image given image processing differ even when the resolution levels are the same.

The parameter acquiring means 59 acquires a processing parameter K1 suitable for the second resolution by making reference to the table T stored in the table storage means 58, based on the second-resolution information G1, reference resolution information G0, and reference image-processing parameter K0. More specifically, when the reference solution of an image is 10 cycle/mm, the reference image-processing parameter K0 is the parameter A1, and the second resolution is 5 cycle/mm, the parameter A2 is acquired as the image-processing parameter K1.

The thus-obtained image-processing parameter K1 suitable for the second resolution, as with the first embodiment, is stored in the file server 62 in correlation with the stored image, or transferred to another equipment through the network 63, along with the second-resolution information G1.

In the case where the image processing unit 80, connected to the network 63, reproduces an image having an enhanced high frequency component by use of a ½ resolution image transferred, in the image processing unit 81 a frequency enhancing process is performed in the same manner as the aforementioned Eqs. (2) and (3).

Thus, as with the first embodiment, the image characteristic of a reduced image given image processing can be made approximately the same as that of the reference resolution image given image processing, regardless of the second resolution level. The third embodiment is also capable of having the effect of shortening the calculating time for acquiring image-processing parameters.

While the present invention has been described with reference to the preferred embodiments thereof, the invention is not to be limited to the details given herein, but may be modified within the scope of the invention hereinafter claimed.

For example, although it has been described in the above-mentioned embodiments that there is a relation of $2^n$ (where n is a negative integer) between the reference resolution and the second resolution and that the second-resolution image becomes a scaled-down image, the present invention is not limited to this. There may be a relation of $2^n$ (where n is a positive integer) and therefore the second-resolution image may be a scaled-up image. Also, there may be an arbitrary relation of magnification, such as ⅓ magnification, etc., regardless of the relation of $2^n$ (where n is a positive or negative integer). In these cases, as with the aforementioned embodiments, a parameter suitable for the second resolution may be calculated and the calculated parameter may be stored or transferred in correlation with an image obtained after pixel density transformation. Instead, a parameter suitable for the second resolution may be calculated based on the reference image-processing parameter, stored or transferred in correlation with an image obtained after pixel density transformation. When, in these cases, a parameter for the second-resolution image is calculated, the present invention is not limited to the aforementioned relative movement (shift) of the reference transform functions used as the reference image-processing parameter. Any method may be employed, so long as it calculates a parameter suitable for the second resolution. For further information on how to calculate a parameter, see, for example, Japanese Patent Application No. 2000-17107.

While, in the above-mentioned embodiments, a description has been given of the frequency enhancing process that employs the band-limited image signals obtained from a blurred image signal (non-sharpness mask image signal), the present invention is not necessarily limited to this. For instance, the invention may use a dynamic-range compressing process, proposed in Japanese Unexamined Patent Publication No. 10 (1998)-75364 by the applicant of this application, which employs band-limited image signals. In addition to the frequency enhancing process and dynamic-range compressing process which employ the band-limited image signals obtained from a blurred image signal, the present invention may use a frequency enhancing process and a dynamic-range compressing process that employ band-limited image signals obtained by making use of a multiple resolution transform such as a wavelet transform, a Laplacian pyramid transform, etc.

What is claimed is:

1. A method of storing or transferring an image along with an image-processing parameter for processing said image, said method comprising, when storing or transferring a second image for storage or transfer which has a second resolution for storage or transfer differing from a reference resolution, the steps of:

correcting a reference image-processing parameter set according to a reference resolution image having said reference resolution, based on a difference between said reference resolution and said second resolution, so that it becomes a second parameter corresponding to said second image;

storing or transferring said second parameter obtained by said correction, along with said second image, wherein the reference image-processing parameter is corrected so that an image characteristic, obtained by reading out the stored second image and processing the second image using the corrected reference image-processing parameter, is substantially the same as an image characteristic obtained by processing the reference resolution image using the reference image-processing parameter, and wherein said processing said image comprises one of applying a frequency-enhancing process and dynamic range process to said image, and said processing is based on said image-processing parameter.

2. A method of storing or transferring an image along with an image-processing parameter for processing said image, said method comprising, when storing or transferring a second image for storage or transfer which has a second resolution for storage or transfer differing from a reference resolution, the step of:

storing or transferring information on a reference image-processing parameter set according to a reference resolution image having said reference resolution and information on said reference resolution along with said second image, wherein said processing said image comprises one of applying a frequency-enhancing process and dynamic range process to said image, and said processing is based on said image-processing parameter.

3. A method of storing or transferring an image along with an image-processing parameter for processing said image, and processing said stored or transferred image by use of said stored or transferred parameter, said method comprising, when storing or transferring a second image for storage or transfer which has a second resolution for storage or transfer differing from a reference resolution, the steps of:

storing or transferring information on a reference image-processing parameter set according to a reference resolution image having said reference resolution and information on said reference resolution along with said second image;

correcting said stored or transferred reference image-processing parameter, based on said stored or transferred information on said reference resolution, so that it becomes a second parameter corresponding to said stored or transferred second image; and processing said stored or transferred second image by use of said second parameter obtained by said correction, wherein the reference image-processing parameter is corrected so that an image characteristic, obtained by reading out the stored second image and processing the second image using the corrected reference image-processing parameter, is substantially the same as an image characteristic obtained by processing the reference resolution image using the reference image-processing parameter, and wherein said processing said image comprises one of applying a frequency-enhancing process and dynamic range process to said image, and said processing is based on said image-processing parameter.

4. An apparatus for storing or transferring an image along with an image-processing parameter for processing said image, said apparatus comprising:

parameter correction means for correcting a reference image-processing parameter set according to a reference resolution image having a reference resolution, based on a difference between said reference resolution and a second resolution for storage or transfer differing from said reference resolution, so that it becomes a second parameter corresponding to a second image for storage or transfer which has said second resolution; and means for storing or transferring said second parameter obtained by said correction, along with said second image, wherein the reference image-processing parameter is corrected so that an image characteristic, obtained by reading out the stored second image and processing the second image using the corrected reference image-processing parameter, is substantially the same as an image characteristic obtained by processing the reference resolution image using the reference image-processing parameter, and wherein said processing said image comprises one of applying a frequency-enhancing process and dynamic range process to said image, and said processing is based on said image-processing parameter.

5. The apparatus according to claim 4, wherein said parameter correction means comprises a second parameter calculator which calculates said second parameter at least based on acquired information related to said second resolution.

6. An apparatus for storing or transferring an image along with an image-processing parameter for processing said image, said apparatus comprising:

means for storing or transferring information on a reference image-processing parameter set according to a reference resolution image having a reference resolution and information on said reference resolution, along with a second image for storage or transfer which has a second resolution for storage or transfer differing from said reference resolution, wherein the reference image-processing parameter is corrected so that an image characteristic, obtained by reading out the stored second image and processing the second image using the corrected reference image-processing parameter, is substantially the same as an image characteristic obtained by processing the reference resolution image using the reference image-processing parameter, and wherein said processing said image comprises one of applying a frequency-enhancing process and dynamic range process to said image, and said processing is based on said image-processing parameter.

7. A system for storing or transferring an image along with an image-processing parameter for processing said image, and processing said stored or transferred image by use of said stored or transferred parameter, said system comprising:

means for storing or transferring information on a reference image-processing parameter set according to a reference resolution image having a reference resolution and information on said reference resolution, along with a second image for storage or transfer which has a second resolution for storage or transfer differing from said reference resolution;

parameter correction means for correcting said stored or transferred reference image-processing parameter, based on said stored or transferred information on said reference resolution, so that it becomes a second parameter corresponding to said stored or transferred second image; and means for processing said stored or transferred second image by use of said second parameter obtained by said correction, wherein the reference image-processing parameter is corrected so that an image characteristic, obtained by reading out the stored second image and processing the second image using the corrected reference image-processing parameter, is substantially the same as an image characteristic obtained by processing the reference resolution image using the reference image-processing parameter, and wherein said processing said image comprises one of applying a frequency-enhancing process and dynamic range process to said image, and said processing is based on said image-processing parameter.

8. The system according to claim 7, wherein said parameter correction means comprises a second parameter calculator which calculates said second parameter at least based on acquired information related to said second resolution.

9. An image processor comprising:

parameter correction means for correcting a stored or transferred reference image-processing parameter, based on stored or transferred information on a reference resolution, so that it becomes a second parameter corresponding to a stored or transferred second image; and means for applying a predetermined image process to said stored or transferred second image use of said second parameter obtained by said correction, wherein the reference image-processing parameter is corrected so that an image characteristic, obtained by reading out the stored second image and processing the second image using the corrected reference image-processing parameter, is substantially the same as an image characteristic obtained by processing the reference resolution image using the reference image-processing parameter, and wherein said processing said image comprises one of applying a frequency-enhancing process and dynamic range process to said image, and said processing is based on said image-processing parameter.

* * * * *